(12) United States Patent
Zhang (10) Patent No.: US 8,134,751 B2
(45) Date of Patent: Mar. 13, 2012

(54) SYSTEMS AND METHODS FOR PREVIEWING COPY PROTECTED DOCUMENTS

(75) Inventor: Liping Zhang, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 723 days.

(21) Appl. No.: 12/206,457

(22) Filed: Sep. 8, 2008

(65) Prior Publication Data

US 2010/0060941 A1 Mar. 11, 2010

(51) Int. Cl.
*H04N 1/387* (2006.01)
*G06K 15/02* (2006.01)

(52) U.S. Cl. ....... 358/3.28; 358/1.18; 358/527; 715/274

(58) Field of Classification Search ............ 358/1.9, 358/3.28, 1.14, 1.18, 527, 540, 442, 450, 358/468; 283/113, 902; 715/204, 273, 274, 715/277
See application file for complete search history.

(56) References Cited

U.S. PATENT DOCUMENTS

| | | | |
|---|---|---|---|
| 7,619,782 B2 * | 11/2009 | Mikami | 358/3.28 |
| 7,738,143 B2 * | 6/2010 | Ishimoto et al. | 358/3.28 |
| 7,929,159 B2 * | 4/2011 | Ono | 358/1.14 |
| 2005/0174596 A1 | 8/2005 | Uchida et al. | |
| 2007/0127055 A1 * | 6/2007 | Kujirai et al. | 358/1.14 |
| 2007/0127056 A1 * | 6/2007 | Hirano et al. | 358/1.14 |
| 2010/0002267 A1 * | 1/2010 | Mikami | 358/3.28 |

* cited by examiner

*Primary Examiner* — Scott A Rogers
(74) *Attorney, Agent, or Firm* — Finnegan, Henderson, Farabow, Garrett & Dunner, L.L.P.

(57) ABSTRACT

Systems and methods consistent with disclosed embodiments provide for a method for previewing documents by associating one of a plurality of copy protection templates with a document; and viewing the document using one of a plurality of options associated with a user-interface by blending an image corresponding to the copy protection template with an image of at least one page in the document, wherein the options comprise: a print preview option that permits the viewing of a printed version of the document; and a copy preview option that permits the viewing of a duplicated version of the document. In some embodiments, the method may be invoked using document processing software and/or software associated with a print driver.

20 Claims, 6 Drawing Sheets

SYSTEMS AND METHODS FOR PREVIEWING COPY PROTECTED DOCUMENTS

BACKGROUND

1. Field of the Invention

The present invention relates to the field of printing, and in particular to systems and methods for previewing documents utilizing tint-block based copy protection features.

2. Description of Related Art

Document printing systems, which are ubiquitous in most modern organizations, permit the quick printing and/or duplicating of documents. Designers of modern printing and copying systems have focused relentlessly on improving printer speed, throughput, features, efficiency, and cost resulting in the virtual universal adoption of printers. Because of the ease with which physical documents on a print medium can be replicated, printed originals often contain copy protection features that inhibit copying and/or permit the visual identification of duplicated documents.

Specifically, two schemes for copy protection are popular. In watermarking, a recognizable image or pattern in paper is applied to paper that appears lighter or darker than the background depending on how the document is viewed. Watermarks are used primarily to serve as indicators of origin, and are not usually used to inhibit copying, or to distinguish copies from originals.

In the second scheme, termed tint-block copy protection, an image that appears to be a simple pattern or background color in an original when visualized in an original document, appears as a different image or a set of characters when the original is duplicated. Tint-block schemes involve the use of background patterns that are not visible on the original document but appear prominently on copies when the original is duplicated. For example, the word "COPY" may appear in large font across the document when the document is duplicated but may be difficult to see in an original printed document.

Many other distinctive patterns or words may also be used to identify duplicates. Other schemes involve the use of patterns such as the "EURion Constellation", which can be used to trigger software in compliant copiers to prevent duplication altogether. The "EURion Constellation" pattern, which consists of five rings, is typically placed on currency notes and can be detected by copiers to prevent counterfeiting of currency notes.

The present disclosure is concerned primarily with copy protection schemes that use tint-blocks. In some instances, copy-protect patterns in a tint-block scheme can be generated and sent to a printer along with the document to be printed. A printer may overlay the pattern over the document image prior to printing. When printed the document will contain copy protection and/or detection features. However, because the process of generating the copy-protect overlay pattern may be separate from the document printing scheme, a user may be unable to preview the final printed document with the copy-protect overlay pattern prior to sending it to the printer.

The inability to preview copy-protect patterns may cause problems when the original document is printed because the overlay pattern may be unsightly, or may be visible to a greater extent than desired on portions of the document, or may be disliked by the user for various other reasons. Moreover, the user may also wish to preview the document as it appears after duplication to ensure that the copy protection scheme is adequately visible, or otherwise suitable, when the original document is duplicated. With current schemes, the inability to preview a document with the copy-protect overlay pattern prior to printing leads to inefficiencies, and a waste of paper, toner, and other resources. Thus, there is a need for systems and methods to preview documents with a copy-protect overlay pattern prior to printing.

SUMMARY

In accordance with disclosed embodiments, apparatus, systems, and methods for previewing documents with a copy-protect overlay pattern are presented. In some embodiments, a method for previewing documents with a copy-protect overlay pattern comprises associating one of a plurality of copy protection templates with a document; and viewing the document using one of a plurality of options associated with a user-interface, wherein the document is viewed by blending an image corresponding to the copy protection template with an image of at least one page in the document, wherein the options comprise: a print preview option that permits the viewing of a printed version of the document; and a copy preview option that permits the viewing of a duplicated version of the document.

Embodiments of the present invention also relate to software, firmware, and program instructions created, stored, accessed, or modified by processors using computer-readable media or computer-readable memory. The methods described may be performed by systems, including a computer and/or a printing device. These and other embodiments are further explained below with respect to the following figures.

DETAILED DESCRIPTION

In accordance with the present invention, systems and methods for previewing documents with a copy-protect overlay pattern are presented.

Figure 1:
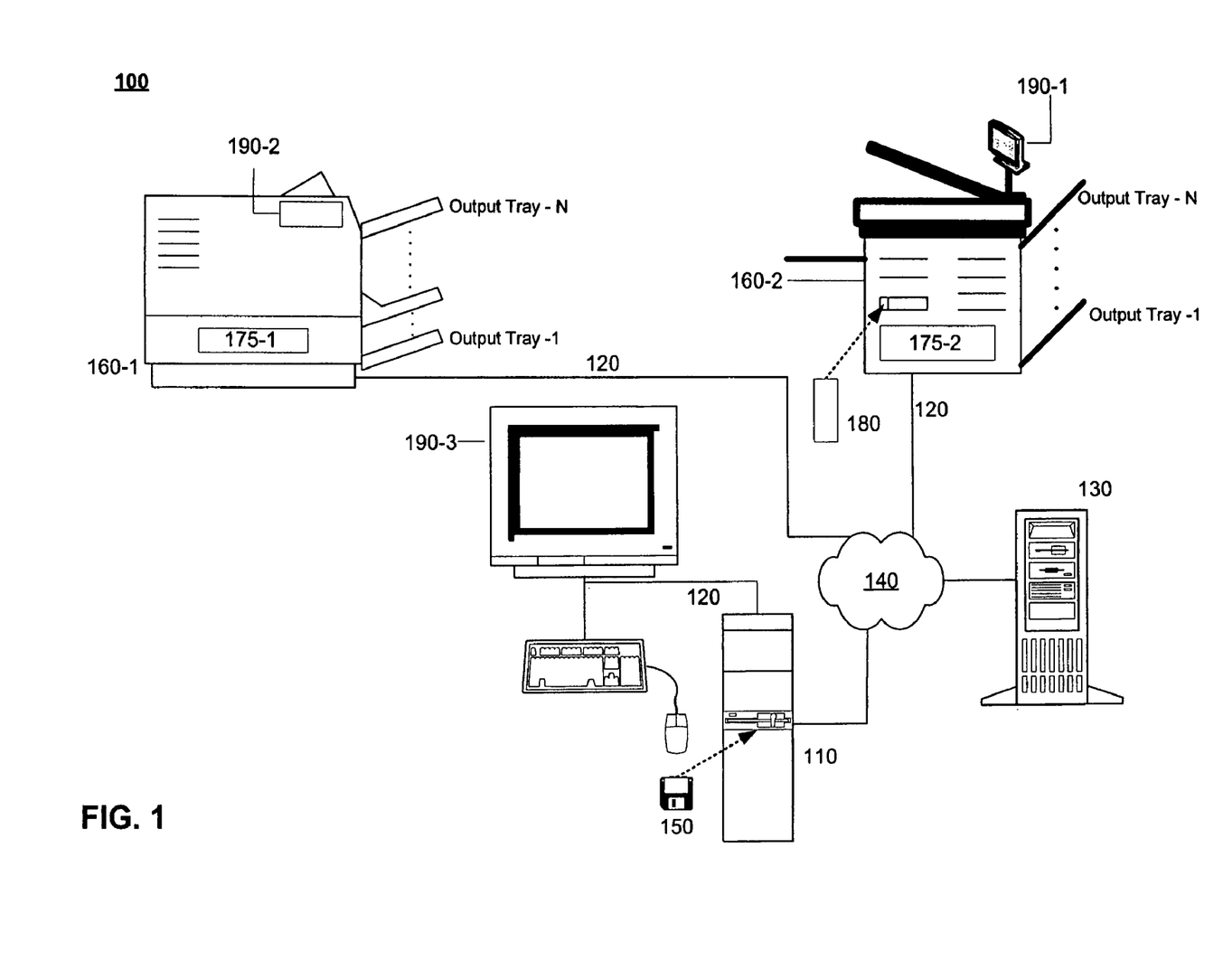
FIG. 1 shows a block diagram of exemplary system 100 for previewing documents with a tint-block copy-protect overlay pattern.

FIG. 1 shows a block diagram of exemplary system 100 for previewing documents with a copy-protect overlay pattern. A computer software application consistent with disclosed embodiments may be deployed on a network of computers and/or printers, as shown in FIG. 1, that are connected through communication links that allow information to be exchanged using conventional communication protocols and/or data port interfaces.

As shown in FIG. 1, exemplary system 100 includes a computer or computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices too (not shown). Computing device 110 and server 130 may be capable of executing software (not shown) that allows previewing documents with a copy-protect overlay patterns prior to be printing on printers 160-1 and/or 160-2.

Printers 160 may be laser printers, ink jet printers, LED printers, plotters, multi-function devices, or other devices that are capable of printing documents. Computing device 110 may contain a removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention. Portions of software applications may reside on removable media and be read and executed by computing device 110 using removable media drive 150. In some embodiments, intermediate and final results and/or data generated by applications may also be stored on removable media.

Connection 120 couples computing device 110, server 130, and printers 160 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as serial, parallel, USB™, SCSI, FIREWIRE™, and/or Ethernet ports for transmission of data through the appropriate connection 120. The communication links could be wireless links or wired links or any combination that allows communication between computing device 110, server 130, and printers 160.

Network 140 could include a Local Area Network (LAN), a Wide Area Network (WAN), or the Internet. In some embodiments, information sent over network 140 may be encrypted to ensure the security of the data being transmitted. Exemplary printing device 160-2, may be a network printer, and can be connected to network 140 through connection 120.

System 100 may include multiple printing devices 160 and other peripherals (not shown), according to embodiments of the invention. Printing devices 160 may be controlled by hardware, firmware, or software, or some combination thereof. Printing devices 160 may include one or more print controller boards 175, such as exemplary print controllers 175-1 and 175-2, which may control the operation of printing devices 160. Printing devices 160 may be controlled by firmware or software resident on memory devices in print controllers 175. In general, print controllers 175 may be internal or external to print devices 160. In some embodiments, printing devices 160 may also be controlled in part by software, including printer drivers, print servers, or other software, running on computing device 110 or server 120.

Printing devices, such as exemplary printing devices 160, may also include consoles 190 such as consoles 190-1 and 190-2, or other interfaces to allow user input and display printer and/or print-job related information to users. In some embodiments, consoles 190 may allow users to set configuration options and enter user identification and/or other authentication information. In some embodiments, console 190 may take the form of a display or user-interface on a monitor for a computer 110 or server 120 coupled to printing devices 160. For example, documents with a copy-protect overlay patterns may be previewed prior to printing using appropriate user interfaces on consoles 190-1, 190-2, and console/monitor 190-3. Further, user interfaces to set one or more configuration options on printing device 160-1 may also be displayed on console/monitor 190-3, which is coupled to computer 110. In some embodiments, applications related to printers 160 such as previewing documents with a copy-protect overlay pattern may be performed and displayed using software running on server 130.

In some embodiments, configuration parameters pertaining to printing device 160 may be user-configurable. For example, document previewing options, copy-protect pattern selection, pre-print options, print resolution, document sizes, color options, and other configuration parameters may be user-configurable. Pre-print options may include options to select one of several copy-protect overlay patterns and to preview documents with copy-protect overlay patterns. A user may also be able to specify input and/or output trays and the use of automatic document feeders to allow batch processing of documents. Users may also be able to log into a printing device 160 to perform administrative functions such as to enable software or firmware on printing device 160 to perform various functions. In some embodiments, the log in process may require a password or other user-authentication mechanism.

A computer software application consistent with the present invention may be deployed on any of the exemplary computers, or printers as shown in FIG. 1. For example, computing device 110 could execute software such as a driver that may control and/or monitor the previewing documents with a copy-protect overlay pattern prior to printing on printer 160-1. In another example, an application for previewing documents with a copy-protect overlay pattern prior to printing could reside and execute on print controller 175-1, but may be invoked and configured using computer 110 using an appropriate Graphical User Interface ("GUI") provided by a print driver. In some embodiments, the GUI may be provided as a user selectable option in a "Print Preview" window for a document processing program. In general, applications may execute in whole or in part on one or more computers, print controllers, or printers in the system. The embodiments described above are exemplary only and other embodiments and implementations will be apparent to one of reasonable skill in the art.

Figure 2A:
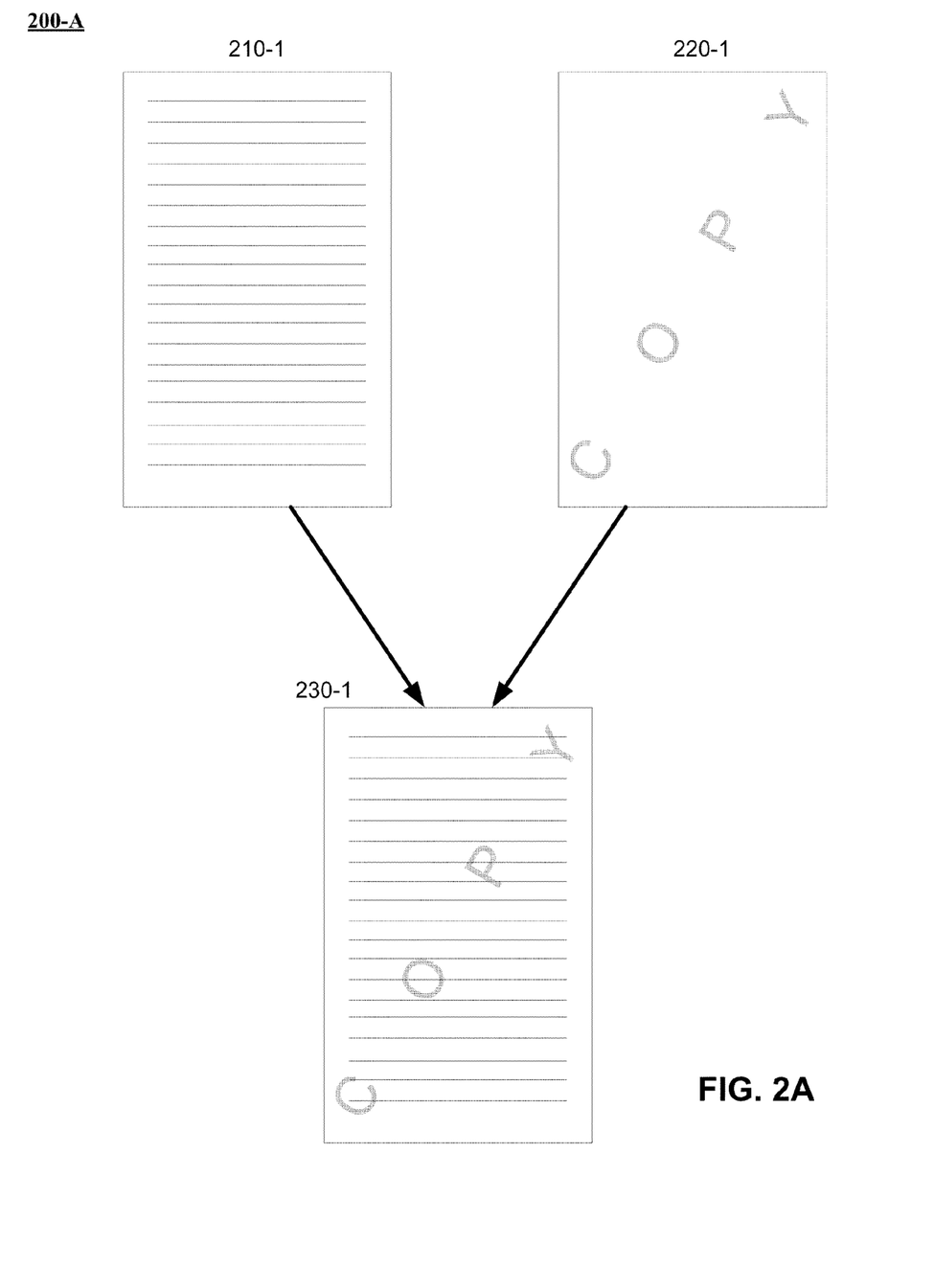
FIGS. 2A and 2B show some exemplary objects 200 used in the document copy-protect print preview process.
Figure 2B:
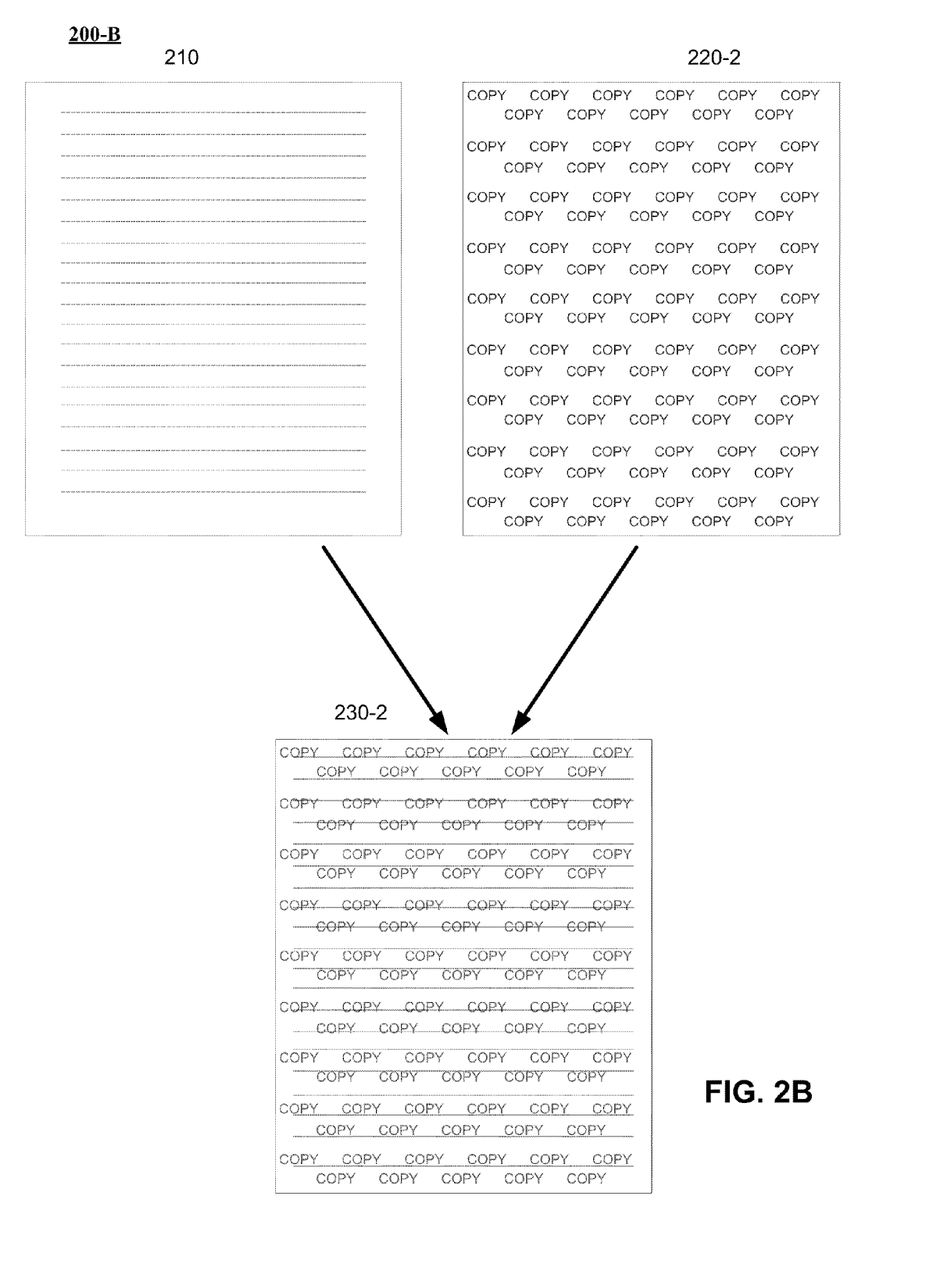

FIGS. 2A and 2B show some exemplary objects 200 used in the document copy-protect print preview process, which include document image 210, copy-protect templates 220, and copy protected document images 230.

As shown in FIGS. 2A and 2B, exemplary document image 210 represents a page in a document to be printed. Pages may include text, images, and/or other graphical objects. A document may comprise one or more pages. Most contemporary document processing software, and/or software associated with printer drivers may be able to generate an image of each page in a document. For example, a document in Microsoft™ Word may be previewed using the "Print Preview" menu option. Accordingly, document image 210 can be generated or made available by document processing or other software. In some embodiments, document image 210 may correspond to a bit-mapped image of a document. Document image 210 may comprise of a series of images corresponding to individual pages in the document. In general, document image 210A can be any representation of a document that can used by printer 160 to generate a printed document on a print medium.

Exemplary copy-protect templates 220-1 and 220-2 may be an image used in a tint-block scheme to protect documents and may be accessible to a document copy-protect print preview process. For example, copy-protect templates 220-1 and 220-2 may be stored on a hard drive, or removable media 150 associated with computer 110, server 120, print controller 175, and/or printer 160. Copy-protect templates 220-1 and 220-2 may be stored in a variety of image formats including Joint Photographic Experts Group ("JPEG"), Graphical Interchange Format ("GIF"), Tagged Image File Format ("TIFF"), bitmap, and/or any other image format capable of being used with disclosed embodiments. As shown in FIG. 2A for illustrative purposes, copy-protect template 210-1 displays an image as it would appear when copied. In exemplary copy-protect template 220-1, the word "C O P Y" appears in large font emblazoned across the page. Copy-protect template 220A may be applied when a printed document is copy-protected using a tint-block scheme. In an original printed document, the image (comprising the word "C O P Y") in copy-protect template 220A may not be visible, or may be visible faintly as a background pattern.

FIG. 2B another exemplary copy template 220-2 in which multiple instances of word "COPY" in small font appear distributed across a page. Copy-protect template 220-2 may also be used in a tint-block scheme to copy-protect printed documents. When copy-protect template 220-2 is printed on an original document, multiple instances of the image in copy-protect template 220-2 may not be visible or may appear in faint lettering as a background.

In some embodiments, exemplary copy protected document image 230-1 may be obtained by overlaying copy-protect template 220-1 and document image 210, as indicated by the arrows in FIG. 2A. Similarly, as shown in FIG. 2B, exemplary copy protected document image 230-2 may be obtained by overlaying copy-protect template 220-2 and document image 210. In some embodiments, the process may be repeated for each page in a document so that all pages in a document contain copy protection features.

In some embodiments, when copy protected document images 230-1 or 230-2 are printed on a print medium the template may be hidden, barely visible, or not immediately apparent to the naked eye. However when a copy protected document is copied the copy-protect patterns can be emphasized and the template may be clearly visible thereby permitting the replicated document to be identified as a copy. Copy-protected document images 230-1 and 230-2, shown for illustrative purposes only may indicate how the copy-protected document may appear when duplicated or copied with copy-protect templates 220-1 and 220-2, respectively.

In some embodiments, both the printed document and the duplicated document may be displayed to the user during a copy protection preview process. In some embodiments, copy-protect templates 220 may be seen as a document layer by document processing software.

Because most modern document processing software operates on a "What You See Is What You Get" ("WYSIWYG") principle, copy-protect software may be integrated with, or operate in conjunction with, or operate as a software layer over document processing software. In these embodiments, copy protection may be previewed using the document processing software's "Print Preview" image of a document in WYSIWYG mode, thereby allowing the user to use a familiar interface to preview copy-protect schemes. In some embodiments, additional icons or menu buttons may be provided to facilitate the copy-protect process.

In some embodiments, saved copy protection template 220 corresponding to a document may be loaded and processed by printers 160 to effectuate copy protection of a printed document. For example, copy protection templates 220 for a document page may be rasterized and blended with the rasterized image of document page 210 in the frame buffer of printers 160. The blended image of document page 210 with any copy protection may then be printed by printers 160 as a copy-protected document. In some embodiments, copy protection template 220 may be saved on a storage device or non-volatile memory coupled to printers 160. In some embodiments, attributes of a document operated upon using copy protection template 220 may be modified to indicate that the document is associated with a copy protection template.

Figure 3:
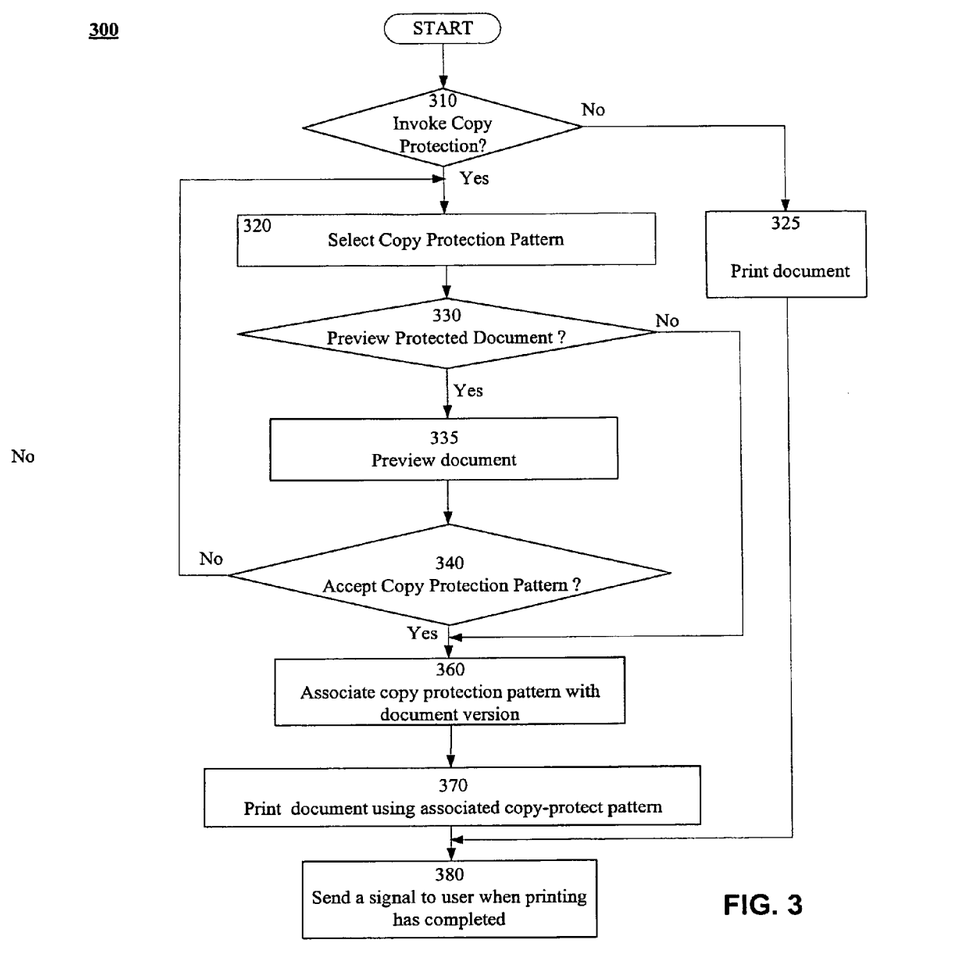
FIG. 3 depicts a flowchart describing an exemplary method 300 for copy protecting documents in schemes employing tint-block copy protection.

FIG. 3 depicts a flowchart describing an exemplary method 300 for copy protecting documents. In some embodiments, exemplary method 300 may be invoked by a user-interface associated with a printer driver for printers 160 at the time of document printing. For example, a "Printing Preferences" or "Print Preview" menu may be used to invoke copy protection and/or copy protection previewing. In other words, the exemplary method 300 may be carried out as a pre-printing process as a part of setting of print preference settings. In one embodiment, exemplary method 300 may be performed by algorithms implemented using some combination of hardware, software, and/or firmware on computer 110, server 130, and/or printers 160.

In step 310, a user can indicate whether document copy protection can be applied to a document, when the document is printed. If no copy protection is to be applied, then the document may be printed without copy protection in step 325.

In some embodiments, if document protection has been indicated then the user may be select appropriate copy protection template 220 in step 320. For example, various patterns may be available to the user for copy protection. These may include simple schemes such as those that lead to one or more instances of the word "COPY" (or some other word or image) being printed when the document is replicated, or more complex schemes and patterns. In some embodiments, the patterns or schemes may trigger copy-inhibition features in copiers when the replication of a document is attempted.

In step 330, the user may be presented with an option to preview the document with selected copy protection template 220. If the user elects not to preview the document ("No") in step 330, then the document may be associated with its selected copy protection scheme in step 360. In some embodiments, a default copy protection template 220 may be associated with documents whose attributes specify copy protection and the document may print with the default copy protection template 220 whenever it is printed. In some embodiments, the default copy-protect scheme may be provided as a "Quick Protect" or similar option. In some embodiments, a distinct default copy protection template 220 may be specified and associated with a copy protected document at the time of its creation or at any time thereafter. In some embodiments, when the user elects to print a document associated with a default copy-protect template, the template name and/or other identifying information may be provided to the print driver, and/or provided by the print driver to printer 160.

If the user elects to preview the document ("Yes") in step 330, then the user may be presented with a "preview window" that displays copy-protected document image 230, in step 335. In some embodiments, the preview window may permit a display of copy-protected document image 230 in printed form and/or duplicated form. In some embodiments, the preview window may be integrated into a "Print Preferences" window, so that a small copy-protected document image 230 may be displayed whenever a copy protection template 220 is selected. In some embodiments, the preview window may be displayed separately and may be enlarged or resized by the user. In some embodiments, a zoom or reduction percentage may be specified for the preview window. Various other options may also be available.

In step 340, the user may be presented with an option to accept the currently selected copy protection template 220. If the user elects to use a new copy protection template, then the algorithm may return to step 320 and iterate from step 320 through 340 until the user is satisfied with a selected template. For example, the preview window may permit the selection of an alternate copy protection template 220 and concurrently update and display copy protected document image 230 using the newly-selected copy protection template 220. If the user accepts the currently selected template then the document may be associated with the selected copy protection template in step 360. Next, in step 370, the document may be printed using associate copy protection template 220. A message that the document has been printed may be sent to the user when printing has completed, in step 380.

It should be noted that the method described above is exemplary only and that various other alternate algorithms will be apparent to one of ordinary skill in the art. For example, a step in flowchart 300 may be broken up into several steps, or one or more steps may be combined. Further, portions of flowchart 300 may be performed variously by document processing software and/or printer driver using one or more of computer 110, server 120, print controller 165, and/or printer 160. For example, if copy protection operations are performed using a viewer associated with document processing software, options may be available to associate the saved copy protection template with the source document. In some embodiments, where a Revision Control System ("RCS") tracks document versions and changes, copy protection templates for document versions may be associated with corresponding versions of the document in the revision control system.

Figure 4A:
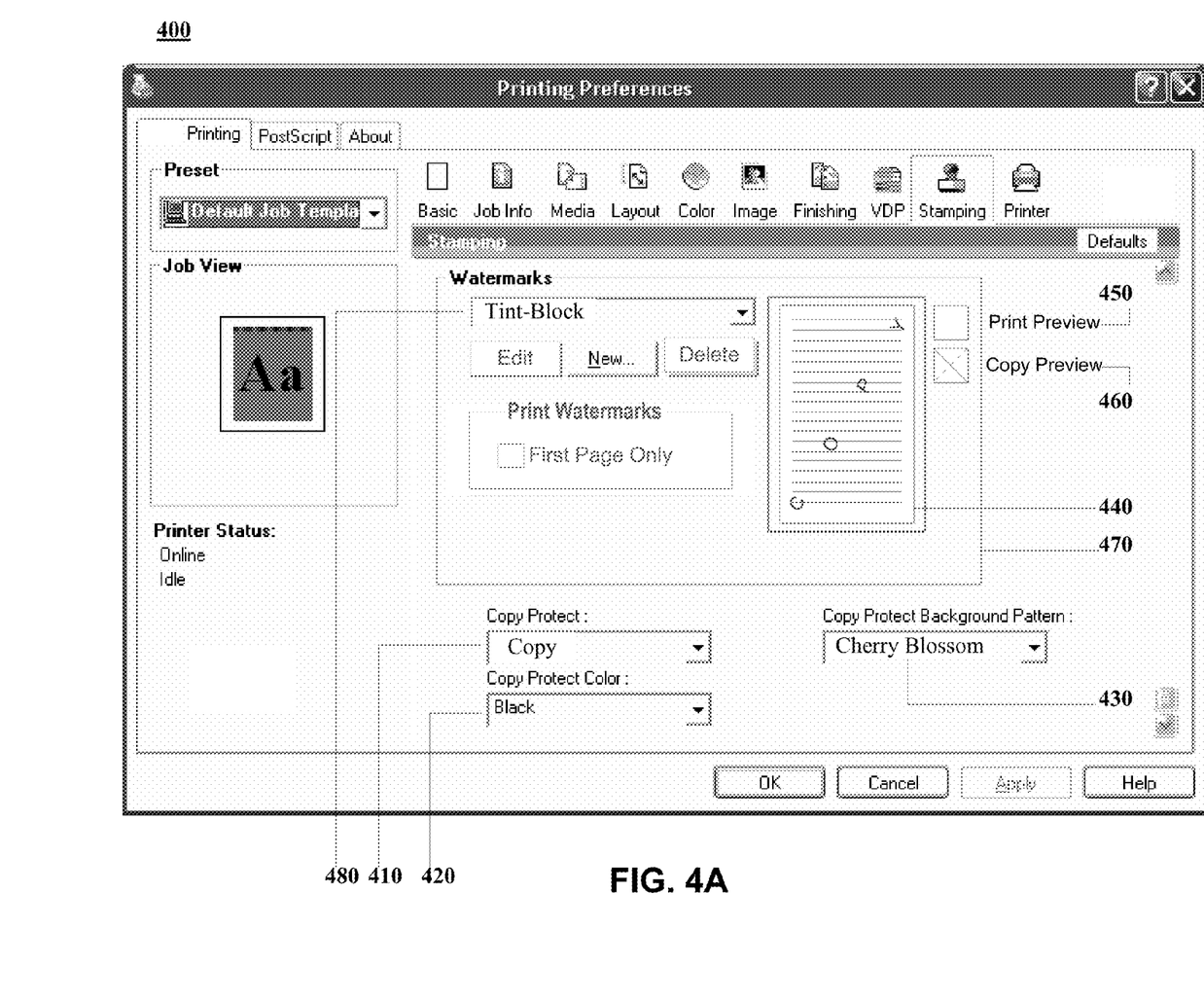
FIG. 4A depicts an exemplary user interface with a copy preview window showing user configurable options in a system for copy protecting documents.
Figure 4B:
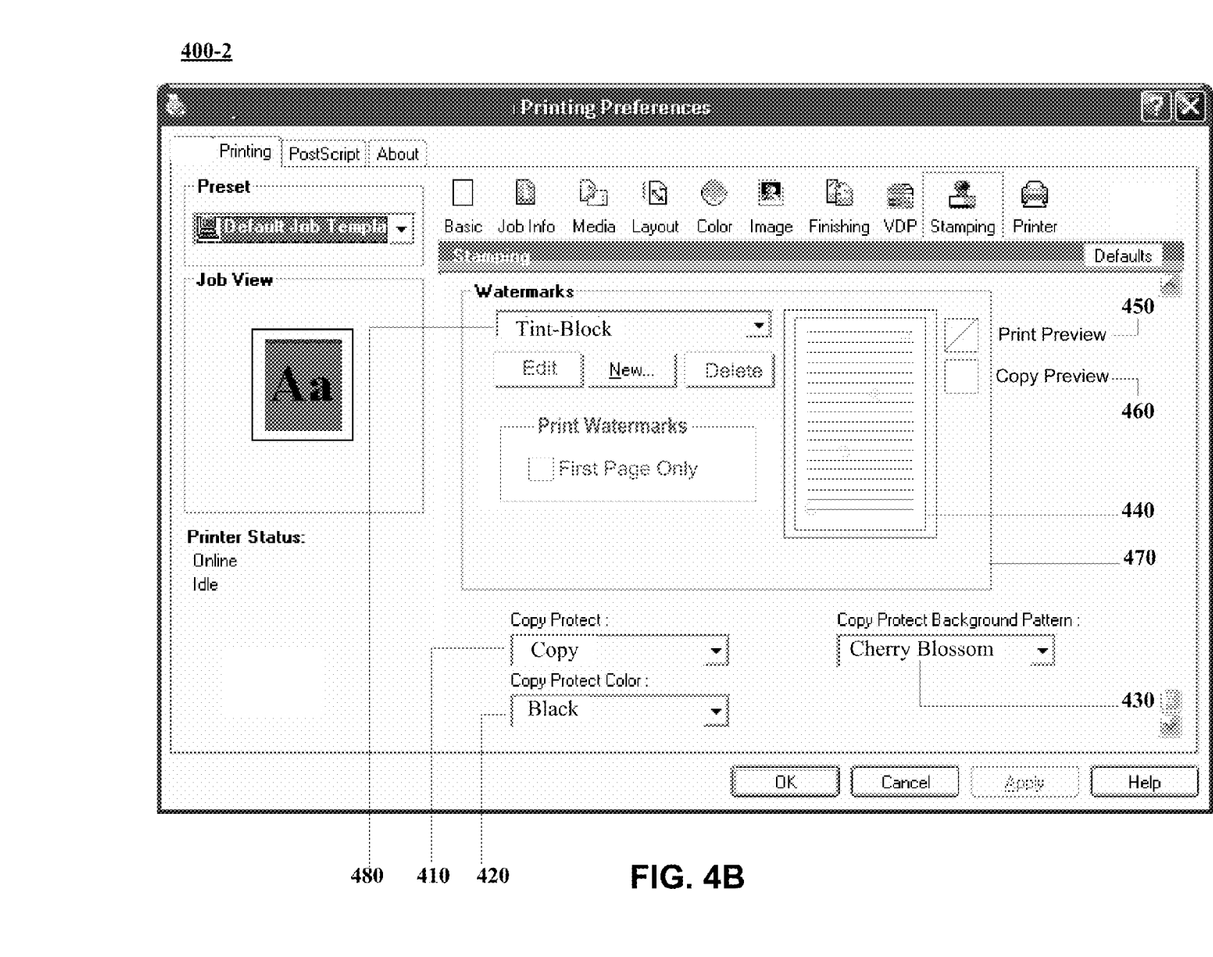
FIG. 4B depicts an exemplary user interface with a print preview window showing user configurable options in a system for copy protecting documents.

FIGS. 4A and 4B depict an exemplary user interface showing user configurable options in a system for previewing copy protected documents. It should be noted that the user interface is exemplary only and other interfaces and options may be provided to configure documents for copy protection.

As shown in FIG. 4A, in exemplary drop down menu 480 associated with "Watermarks" sub-window 470, the user may be presented with options to select a preview for watermarks or tint-blocking. Specifically, the user may be presented the drop-down menu 480 to choose options such as, "None," "Watermark," and "Tint-Block." For instance, when "None" is selected from the drop-down menu 480, any user selectable options for watermarks and tint-blocks are disabled (grayed out). Similarly, as shown in FIG. 4A, when "Tint-Block" is selected from the drop-down menu 480, user selectable options for tint-blocking are enabled and user-selectable options pertaining to watermarks are disabled.

As shown in FIG. 4A, the user may select various settings for copy protection templates. Specifically, the user may select text string for copy protection, a text color for the text string, and a background pattern for the copy protection from exemplary drop-down menus 410, 420, and 430, respectively. In one embodiment, exemplary drop-down menu 410 for selecting text string for copy protection may include "Copy," "Confidential," "Void," or other options in menu 410. As shown in FIG. 4A, the option "Copy" is illustratively selected. In exemplary drop-down menu 420, various colors may be listed, and in FIG. 4A, drop-down menu 420 indicates that black has been selected as the text string color.

In one exemplary embodiment, options for setting background pattern may include "None," "Cherry Blossom," and any other options available in drop-down menu 430. For example, as shown in FIG. 4A, a "Cherry Blossom" background pattern appears for selection in drop down menu 430. In some embodiments, an icon may be displayed along with a textual description of the templates to permit the user to obtain a visual indication of the appearance of the copy protection template selected using options specified in drop-down menus 410, 420, and 430.

In preview window 440, copy protected document images 230 may be displayed. In one embodiment, both the watermark copy protection image and the tint-block copy protection image may be displayed in preview window 440, which may be a common display window for both the watermark and tint-block options. When "Tint-Block" is selected in the drop-down menu 480, the toggle switches 450 and 460 are enabled so that the user can select a copy protected document print preview, which displays the document as it would appear when printed, or a copy protected document copy preview, which displays the copy protected document as it would appear when duplicated.

FIG. 4B shows user interface 400 in a "Print Preview" mode as indicated by Print Preview selection 450. Further, as shown in FIG. 4B, "Tint-Block" has been selected in drop down menu 480 associated with "Watermarks" sub-window 470, and options pertaining to watermarking have also been disabled. Print Preview allows the user to preview the document, as it would appear when printed. Depending on the tint-block options selected, the print preview may be only slightly visible, or may not be visible in print preview window 440. Accordingly, in the document displayed in print preview window 440 it may be difficult to observe the visual artifacts indicating that copy protection has been applied.

In some embodiments, the user may be able to enlarge preview window 440 in both "Copy Preview" and "Print Preview" modes to obtain more detailed previews in preview window 440. As shown in FIG. 4, various other configuration options may also be available to user using user interface 400.

Further, methods consistent with embodiments of the invention may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention and, therefore, no detailed computer program could be provided that would be applicable to these many different systems. Each user of a particular computer will be aware of the language, hardware, and tools that are most useful for that user's needs and purposes.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware.

Embodiments of the present invention also relate to compute-readable media that include program instructions or program code for performing various computer-implemented operations based on the methods and processes of embodiments of the invention. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A method for previewing a document with copy protection applied, the method performed by a system comprising a processor, a memory, and a display device, the method comprising:

associating, by the processor, one of a plurality of copy protection templates with the document; and displaying the document with the associated copy protection template on the display device using one of a plurality of options selectable via the user-interface, wherein the document is displayed by blending an image corresponding to the associated copy protection template with an image of at least one page in the document, wherein the options comprise:

a print preview option that displays a first generation version of the document as it would appear when printed from its original format with the associated copy protection template; and a copy preview option that displays a second generation version of the document as it would appear when duplicated from a printed format with the associated copy protection template.

2. The method of claim 1, wherein the document is previewed prior to printing the document on a print medium.

3. The method of claim 1, wherein the copy protection template is stored as a document layer.

4. The method of claim 1, wherein associating one of a plurality of copy protection templates with a document further comprises receiving an indication from a user interface that an icon was selected, wherein the icon provides a visual indication of the pattern in the selected copy protection template.

5. The method of claim 1, wherein the method is invoked using document processing software.

6. The method of claim 1, wherein the method is invoked from a console coupled to a printer coupled to the system.

7. The method of claim 1, wherein the method is invoked from a user interface associated with the system.

8. The method of claim 1, wherein the copy protection template is stored as a bitmapped image in the memory.

9. The method of claim 1, wherein the copy protection template is associated with the document using user interfaces associated with document processing software.

10. The method of claim 1, wherein associating at least one copy protection template with the document further comprises using a document attribute of the document to identify the copy protection template associated with the document.

11. A non-transitory computer-readable medium that stores instructions, which when executed by a processor perform steps in a method for previewing a document comprising:

associating one of a plurality of copy protection templates with the document; and displaying the document with the associated copy protection template on the display device using one of a plurality of options selectable via the user-interface, wherein the document is displayed by blending an image corresponding to the associated copy protection template with an image of at least one page in the document, wherein the options comprise:

a print preview option that displays a first generation version of the document as it would appear when printed from its original format with the associated copy protection template; and a copy preview option that displays a second generation version of the document as it would appear when duplicated from a printed format with the associated copy protection template.

12. The computer readable medium of claim 11, wherein the document is previewed prior to printing the document on a print medium.

13. The computer readable medium of claim 11, wherein the copy protection template is stored as a document layer.

14. The computer readable medium of claim 11, wherein associating one of a plurality of copy protection templates with a document further comprises receiving an indication from a user interface that an icon was selected, wherein the icon provides a visual indication of the pattern in the selected copy protection template.

15. The computer readable medium claim 11, wherein the method is invoked using document processing software.

16. The computer readable medium of claim 11, wherein the method is invoked from a console coupled to a printer coupled to the system.

17. The computer readable medium of claim 11, wherein the method is invoked from a user interface associated with the system.

18. A system for previewing a document with copy protection applied, the system comprising:

a user interface for receiving user input indicating one of a plurality of options, wherein the options comprise a print preview option that displays a first generation version of the document as it would appear when printed from its original format with the associated copy protection template; and a copy preview option that displays a second generation version of the document as it would appear when duplicated from a printed format with the associated copy protection template;

a processor for associating one of a plurality of copy protection templates with the document; and a display for displaying the document with the associated copy protection template according to the indicated option, wherein the document is displayed by blending an image corresponding to the associated copy protection template with an image of at least one page in the document and displaying the blended result.

19. The system of claim 18, wherein the copy protection template is stored as a document layer, and the image is blended with the copy protection template by use of overlays.

20. The system of claim 18, wherein the copy protection template is stored as a bitmapped image.